(12) United States Patent
Allen

(10) Patent No.: US 10,831,262 B2
(45) Date of Patent: *Nov. 10, 2020

(54) DYNAMIC AUGMENTED REALITY MEDIA CREATION

(71) Applicant: International Business Machines Corporation, Armonk, NY (US)

(72) Inventor: Corville O. Allen, Morrisville, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/574,296

(22) Filed: Sep. 18, 2019

(65) Prior Publication Data
US 2020/0012337 A1 Jan. 9, 2020

Related U.S. Application Data

(63) Continuation of application No. 15/817,246, filed on Nov. 19, 2017, now Pat. No. 10,452,129, which is a continuation of application No. 13/775,200, filed on Feb. 24, 2013, now Pat. No. 9,841,810, which is a continuation of application No. 13/707,019, filed on Dec. 6, 2012, now Pat. No. 9,851,783.

(51) Int. Cl.
*G06F 3/01* (2006.01)
*G06T 11/00* (2006.01)
*G06T 11/60* (2006.01)

(52) U.S. Cl.
CPC .............. *G06F 3/011* (2013.01); *G06T 11/00* (2013.01); *G06T 11/60* (2013.01)

(58) Field of Classification Search
CPC ........... G06F 3/011; G06T 11/00; G06T 11/60
See application file for complete search history.

(56) References Cited

U.S. PATENT DOCUMENTS

| 5,746,656 A | 5/1998 | Bezick et al. |
| 6,616,529 B1 | 9/2003 | Qian et al. |
| 8,358,903 B1* | 1/2013 | Meads .................... H04N 5/765 348/86 |
| 9,123,316 B2 | 9/2015 | Flaks et al. |
| 9,197,864 B1* | 11/2015 | Starner .............. H04N 5/23222 |
| 9,794,527 B1* | 10/2017 | Balez ...................... H04N 7/185 |
| 10,555,775 B2* | 2/2020 | Hoffman ................ A61B 34/20 |
| 2004/0010803 A1 | 1/2004 | Berstis |

(Continued)

OTHER PUBLICATIONS

Correia, Nuno, et al.; HyperMem: A System to Store and Replay Experiences in Mixed Reality Worlds; Proceedings of the 2005 International Conference on Cyberworlds; 2005 (8 pages).

*Primary Examiner* — Yu Chen
(74) *Attorney, Agent, or Firm* — James L. Baudino

(57) ABSTRACT

A technique for dynamic augmented reality media creation includes an analysis of reality content received by a device. Augmentation data is identified based on the analysis of the reality content, and then the augmentation data is displayed to the user via the device. A capture module determines whether the reality content meets capture event criteria and, if the criteria is met, augmented reality content is created and captured prior to a display of the augmentation data to the user.

20 Claims, 4 Drawing Sheets

(56) References Cited

U.S. PATENT DOCUMENTS

| | | | |
|---|---|---|---|
| 2004/0218059 A1* | 11/2004 | Obrador | H04N 1/212 |
| | | | 348/220.1 |
| 2008/0113812 A1 | 5/2008 | Kwon | |
| 2008/0192129 A1 | 8/2008 | Walker et al. | |
| 2008/0250080 A1 | 10/2008 | Arrasvuori et al. | |
| 2008/0316312 A1 | 12/2008 | Castillo et al. | |
| 2009/0082095 A1 | 3/2009 | Walker et al. | |
| 2009/0204600 A1 | 8/2009 | Kalik et al. | |
| 2009/0209335 A1 | 8/2009 | Pearce | |
| 2009/0267956 A1 | 10/2009 | Greaves et al. | |
| 2011/0242134 A1* | 10/2011 | Miller | A63F 13/655 |
| | | | 345/633 |
| 2012/0134651 A1 | 5/2012 | Cottrell | |
| 2013/0222638 A1 | 8/2013 | Wheeler et al. | |
| 2013/0236040 A1 | 9/2013 | Crawford et al. | |
| 2014/0002490 A1* | 1/2014 | Teegan | G06T 19/006 |
| | | | 345/633 |
| 2014/0098137 A1 | 4/2014 | Fein et al. | |

\* cited by examiner

DYNAMIC AUGMENTED REALITY MEDIA CREATION

BACKGROUND

Augmented reality generally refers to presenting real-world and virtual reality or augmentation data in a combined display to a user. For example, augmented reality systems may enhance real-world content by enhancing such content with computer-generated supplemental information. The augmentation information may be overlaid onto real-world images or displayed in a manner to enable the user to view both the real-world content and the augmentation information in a combined view.

BRIEF SUMMARY

According to one aspect of the present disclosure a system and technique for dynamic augmented reality media creation is disclosed. The system includes a device wearable by a user having an interface configured to receive and store, from the user, capture event criteria. An augmentation module is configured to receive and analyze reality image data corresponding to reality content perceived by the user, identify augmentation data based on the analysis of the reality image data, and display the augmentation data to the user via the device. A capture module is configured to determine whether the reality data meets the capture event criteria and, responsive to the reality data meeting the capture event criteria, combine the augmentation data with the reality image data to generate augmented reality content and capture and store the augmented reality content prior to the display of the augmentation data to the user via the device.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
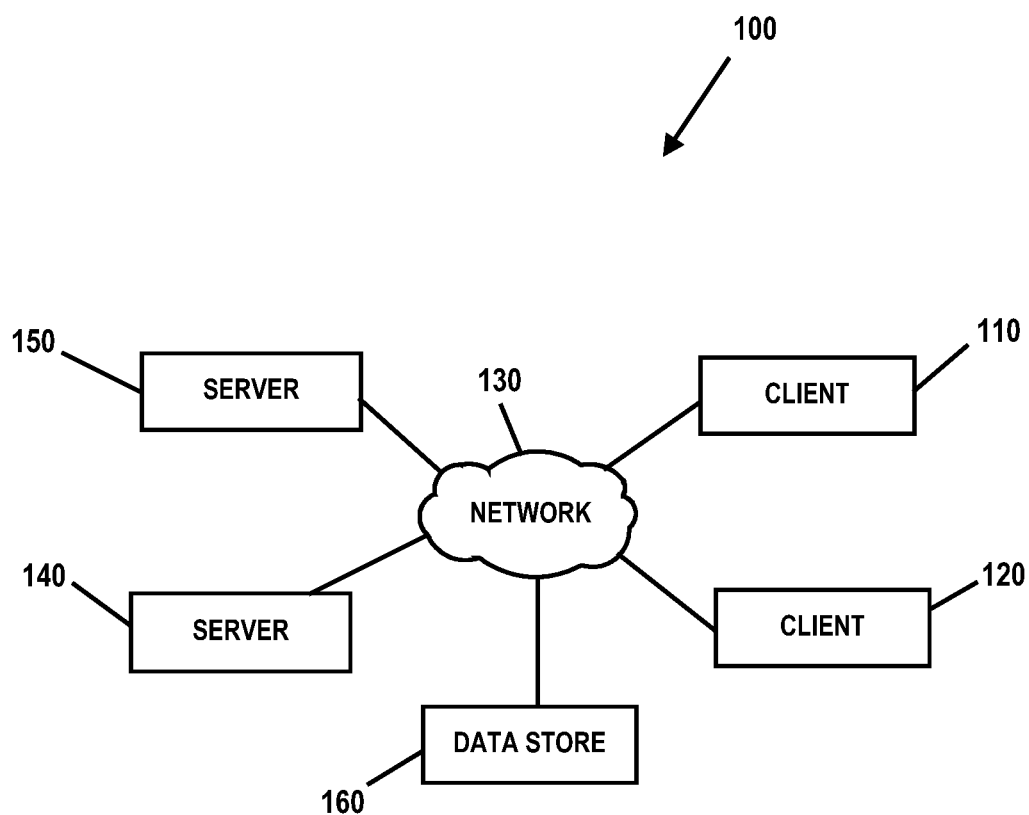
FIG. 1 is an embodiment of a network of data processing systems in which the illustrative embodiments of the present disclosure may be implemented.

Embodiments of the present disclosure provide a method and technique for dynamic augmented reality media creation. For example, in some embodiments, the method and technique includes: analysis of the reality data; generating augmented reality content; determining if the reality data corresponds to predetermined capture event criteria; and responsive to determining that the reality data corresponds to the predetermined capture event criteria, capturing the augmented reality content. Embodiments of the present disclosure enable the dynamic and automatic creation/capture of augmented reality content (e.g., real-world content overlaid/supplemented with augmentation information). Embodiments of the present disclosure may evaluate the real-world events taking place as well as augmentation information that will supplement the real-word perception against certain predefined criteria to determine whether to initiate the capture/storage of augmented reality content. The captured augmented reality content may be in the form of video content, screenshots/images, audio, or otherwise. Further, embodiments of the present disclosure may spawn multiple threads to concurrently capture such augmented reality content as such content is being rendered on the device.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
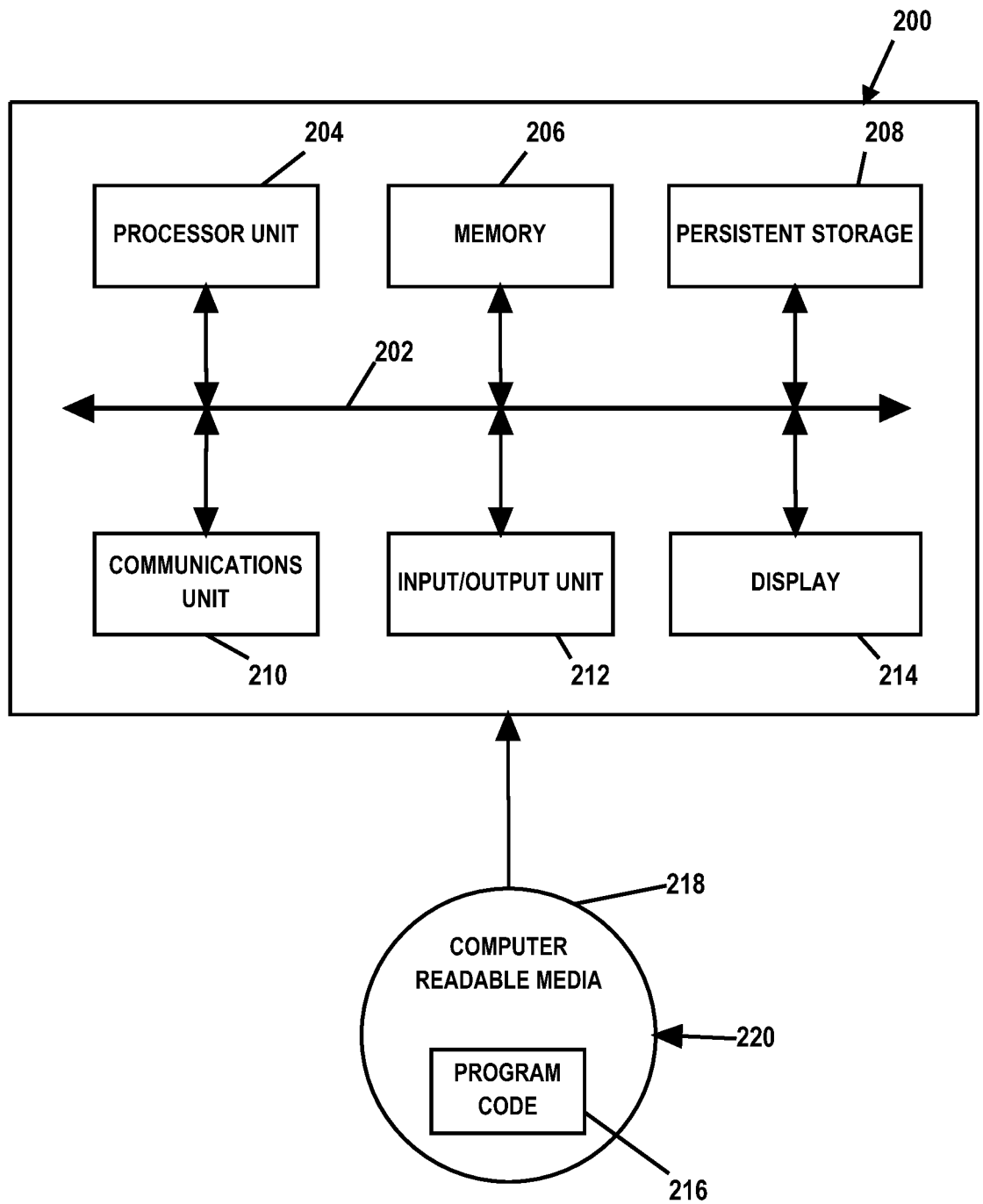
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for dynamic augmented reality media creation according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
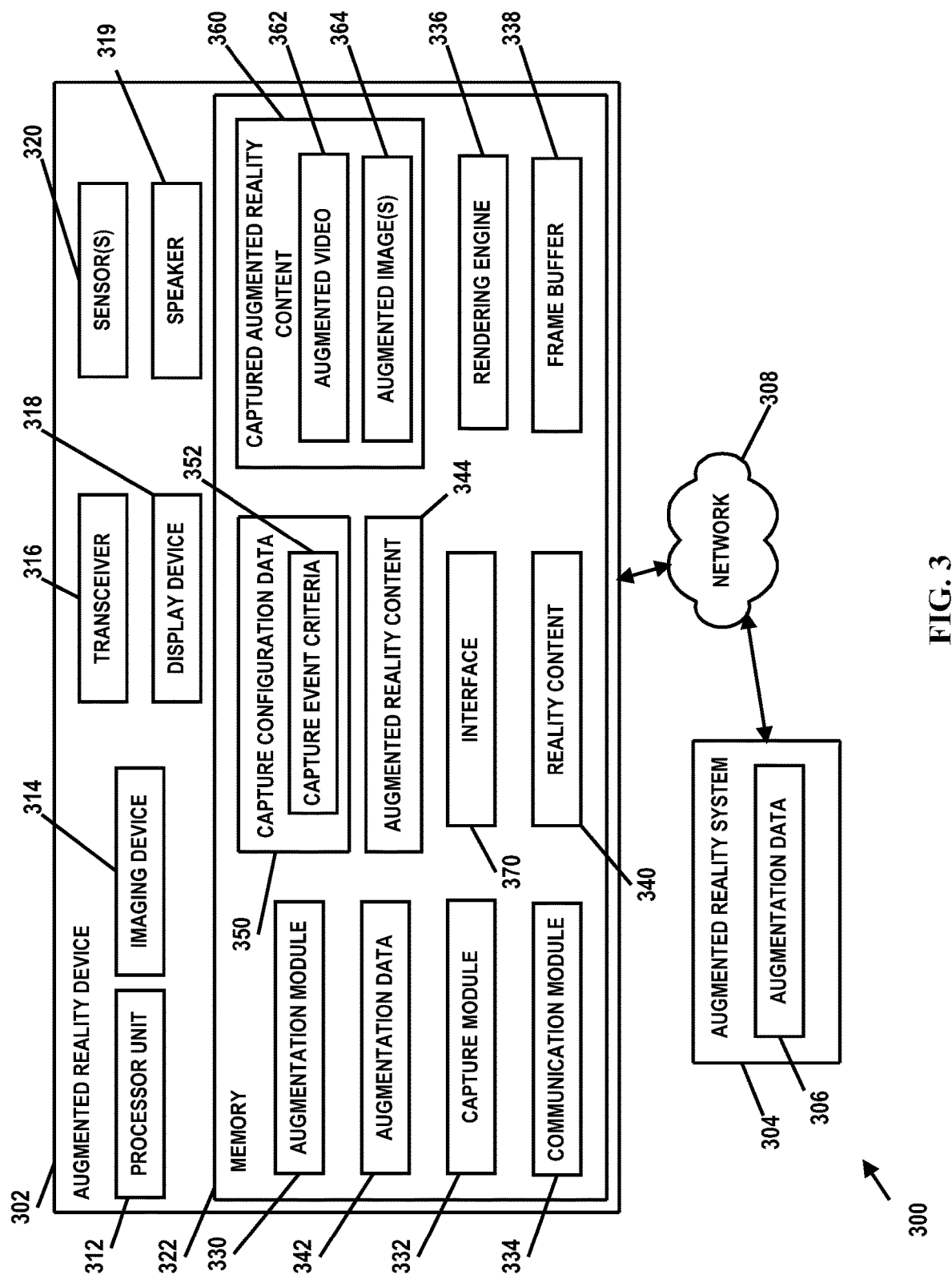
FIG. 3 is a diagram illustrating an embodiment of a data processing system for dynamic augmented reality media creation in which illustrative embodiments of the present disclosure may be implemented.

FIG. 3 is an illustrative embodiment of a system 300 for dynamic augmented reality media creation. System 300 may be implemented on data processing systems or platforms such as, but not limited to clients 110 and/or 120, system 200, or at other data processing system locations. In the embodiment illustrated in FIG. 3, system 300 comprises an augmented reality device 302 and an augmented reality system 304. Augmented reality device 302 may comprise any type of device for receiving/analyzing reality content (real-world data, such as visual, audio and/or other types of real-world perceptible information) and generating/displaying augmentation data (e.g., virtual reality data) in connection with the reality content. For example, augmented reality device 302 may comprise, but not be limited to, a headset, glasses/goggles, a smartphone, a tablet computer, a mobile device, or other type of device operable to display augmented content in connection real-word visual content. Augmented reality system 304 may comprise any type of computing and/or server system (e.g., remote from device 302) providing augmentation data 306 for augmenting reality content on device 302. Augmentation data 306 may include, but not be limited to, sound, text, graphic content, video content, and/or global positioning system (GPS) data. For example, in some embodiments, augmentation data 306 may be streamed in real-time over a communications network 308 to device 302 based on reality content experienced/detected by device 302.

In FIG. 3, device 302 includes a processor unit 312, an imaging device 314, a transceiver 316, a display device 318, a speaker 319, one or more sensors 320, and a memory 322. Imaging device 314 may comprise any type of device for receiving reality content (e.g., a camera). Transceiver 316 is operable to enable wireless communications between device 302 and another entity/source such as, but not limited to, augmented reality system 304, a telephonic communications system, a personal computing system, a GPS network, etc. Display device 318 may comprise any type of device enabling the display/presentation of reality content and/or augmented reality content (i.e., reality content augmented with augmentation data/content). Display device 318 may comprise a liquid crystal display (LCD) device, image projection device (e.g., for projecting augmentation content/data onto a screen, glasses/goggles lens, and/or otherwise displaying augmentation content (alone or in combination with reality content) within the field of view of a user of device 302). Sensor(s) 320 may comprise any type of sensor for detecting environmental conditions relative to device 302 such as, but not limited to, orientation, motion/movement, GPS data/signals, etc.

In the embodiment illustrated in FIG. 3, memory 322 includes an augmentation module 330, a capture module 332, a communication module 334, a rendering engine 336 and a frame buffer 338. Augmentation module 330 is configured to analyze reality content 340 detected/received by device (e.g., reality or real-world image data acquired via imaging device 314 or another type of real-world data obtained by other types of devices, such as real-world audio content), determine, request and/or identify augmentation data 342 for augmenting reality content 340 and generating/displaying augmented reality content 344. Augmented reality content 344 may represent a combined representation of augmented content (e.g., combining augmentation data 342 with reality content 340 and presenting/displaying the combined content (e.g., on display device 318, displaying/projecting/overlaying augmentation data 342 into a field of view of a user such that augmentation data 342 is presented to the user in combination with real-world content perceived by the user, presenting augmentation data 342 in the form of audio content via speaker 319 or other audio component, etc.)). Capture module 332 is configured to capture/record augmented reality content 344 in response to a user's desired criteria. Communication module 334 is configured to enable communications (e.g., wired and/or wirelessly) between device 301 and another system/device (e.g., augmented reality system 304, a telephonic communications system, etc.). Rendering engine 336 is configured to render image content (e.g., video and/or still/screen shot image data). Augmentation module 330, capture module 332, communication module 334 and/or rendering engine 336 may be implemented in any suitable manner using known techniques that may be hardware-based, software-based, or some combination of both. For example, augmentation module 330, capture module 332, communication module 334 and/or rendering engine 336 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the embodiment illustrated in FIG. 3, memory 322 also includes capture configuration data 350. Capture configuration data 350 comprises information associated with a user's desired criteria for real-time (or near real-time) capturing/recording of augmented reality content 344. For example, in the illustrated embodiment, capture configuration data 350 includes capture event criteria 352 indicating certain events that, if occur or are anticipated to occur, capture module 332 automatically captures/records augmented reality content 344 and stores such content as captured augmented reality content 360. Captured augmented reality content 360 may be in the form of a video clip of a set/predetermined and/or variable duration (e.g., augmented video 362, which may have visual and/or audio components), image snapshots/screen captures (e.g., augmented images 364) or other types of data content (e.g., audio). Criteria 352 may correspond to real-world content (e.g., experiencing a certain event, such as an encounter with a particular person, detecting a favorite book, detecting a name of a street sign, detecting a name of a restaurant, receiving a telephone call, etc.), augmented content (e.g., the presentation of augmentation data 342 in the form of a telephone number, an image of a person (e.g., a telephone caller), GPS coordinates, other book titles by a detected name of an author, etc.), and/or augmented reality content 344 (e.g., the combination of real-world content and augmentation content meeting a predefined criteria, such as real-word content a photograph of a musician in combination with augmented information of a sound clip of a musical piece performed by such musician). In some embodiments, capture module 332 is configured to interface with augmentation module 330 to determine whether reality content 340, augmentation data 342 and/or augmented reality content 344 meets (or is likely to meet) criteria 352. In response to reality content 340, augmentation data 342 and/or augmented reality content 344 meeting (or anticipating it meeting) criteria 352, capture module 332 automatically (i.e., without further user intervention) captures/records augmented reality content 344 and stores such captured content as captured augmented reality content 360.

As an illustrative example, consider that a user of device 302 is walking down a street and views a restaurant sign. Augmentation module 330 analyzes reality content 340 associated with image content detected/received via imaging device 314 corresponding to the viewed restaurant sign and determines/accesses augmentation data 342 to display augmentation data 342/306 associated with such restaurant. Augmentation data 342/306 may include information stored locally on device 302 and/or retrieved from an external source (e.g., augmented reality system 304). In this example, augmentation data 342/306 may include an address of the restaurant, the cuisine at the restaurant, a phone number of the restaurant, etc. Criteria 352 may indicate that in response to detecting a restaurant having a particular cuisine, capture module 332 should automatically capture/record augmented reality content 344 associated with such restaurant. In this example, the captured augmented reality content 360 may comprise an augmented image 364 depicting an image of an exterior view of the restaurant along with augmentation data 342/306 depicting a phone number and/or GPS coordinates of the restaurant. Captured augmented reality content 360 may be played back at a later time, uploaded to a remote server, downloaded to another device, etc.

In some embodiments, capture module 332 captures/records augmented reality content 344 prior to display/presentation to a user of device 302. For example, in some embodiments, capture module 332 may interface with rendering engine 336 and/or frame buffer 338 to capture augmented reality content 344 prior to its display/presentation (e.g., prior to its presentation on display device 318). In this manner, capture module 332 may initiate recording/capturing of augmented reality content 344 before a user of device would be presented with such augmented reality content 344, thereby ensuring the capture of such content (which may otherwise be missed if the capture must be manually initiated in response to the user viewing the augmented reality content 344).

In some embodiments device 302 includes an interface 370 enabling a user to input capture configuration data 350 to device 302. For example, interface 370 may comprise a wireless interface 370 enabling a user to wirelessly input/store/edit capture configuration data 350. Interface 370 may enable a user of device 302 to input capture configuration data 350 from another wireless device (e.g., a cellular telephone). Interface 370 may also support non-wireless input of capture configuration data 350. Interface 370 may be implemented in any suitable manner using known techniques that may be hardware-based, software-based, or some combination of both. For example, interface 370 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In some embodiments, capture module 332 is configured to trigger the capturing/recording of augmented reality content 344 on separate threads. For example, in some embodiments, capture module 332 may be configured to launch one thread for capturing augmented video 362 and another thread for capturing augmented images(s) 364. Thus, capture module 332 may be configured to cause the concurrent capture of augmented video and screenshot images, thereby alleviating the need to play back recorded video content to thereafter create still images of the augmented content.

Embodiments of the present disclosure enable the dynamic creation/capture of augmented reality content 344 in anticipation of an event and/or augmentation content meeting criteria 352. For example, in some embodiments, if a user of device 302 enters a library, criteria 352 may be configured to capture content if books and/or displays associated with one or more favorite authors are detected. In response to the user approaching a section of books having authors listed alphabetically, augmentation module 330 may identify the names of authors on the detected books and, as the user nears a name of a configured author, capture module 332 may initiate a capture of augmented reality content 344. If after some predetermined time period criteria 352 does not materialize and/or augmentation module 330 does not detect reality content 340 associated with a configured author, capture module 332 may purge/delete the captured/recorded content that ended up not matching criteria 352.

Figure 4:
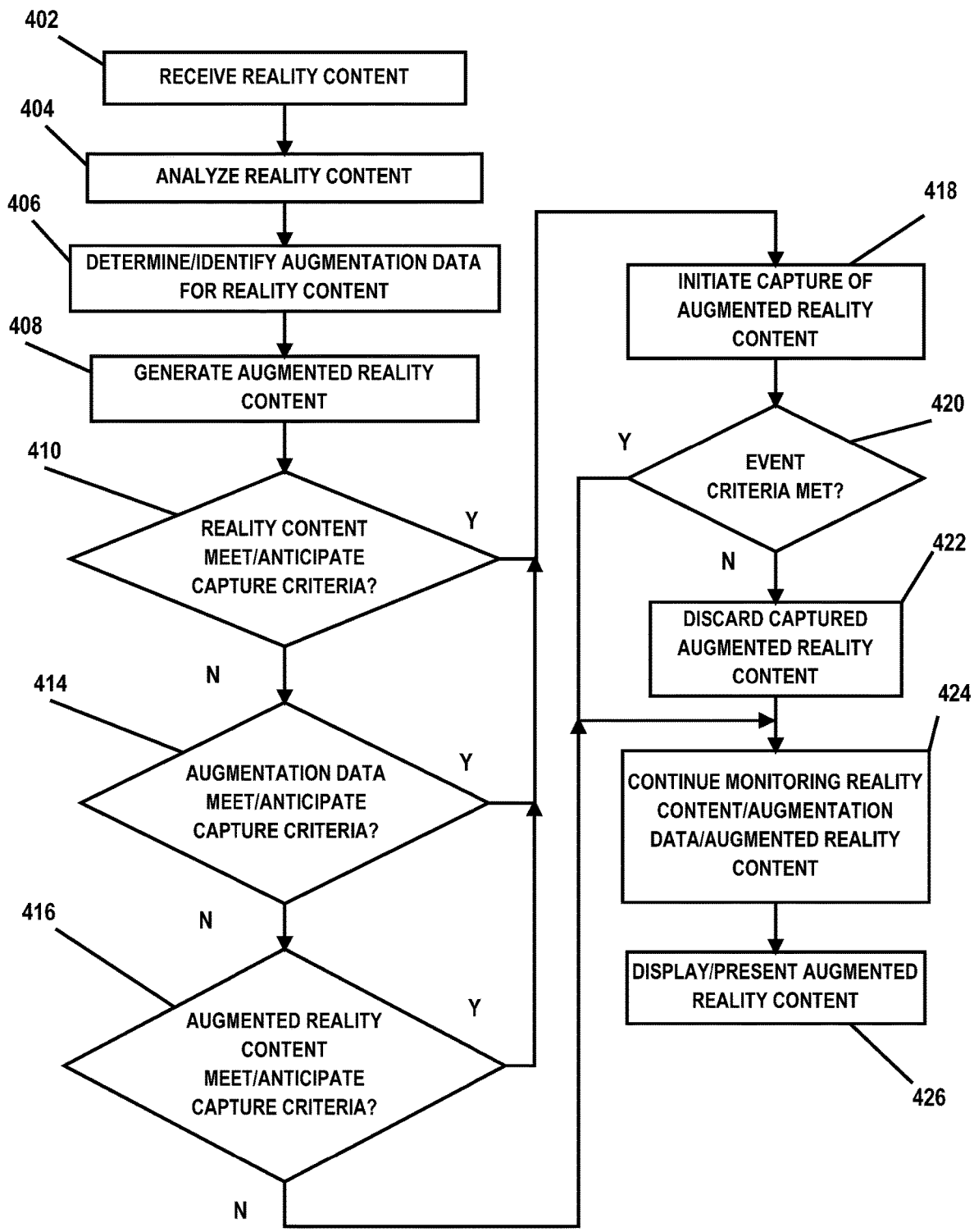
FIG. 4 is a flow diagram illustrating an embodiment of a method for dynamic augmented reality media creation according to the present disclosure.

FIG. 4 is a flow diagram illustrating an embodiment of a method for dynamic augmented reality media creation. The method begins at block 402, where reality content 340 is received. At block 404, augmentation module 330 analyzes the reality content 340. At block 406, augmentation module 330 determines and/or otherwise identifies augmentation data 342/306 based on the detected reality content 340. In some embodiments, augmentation module 330 may interface with communication module 334 to initiate communications with augmented reality system 304 to determine/identify augmentation data 342/306 based on the real-word content being experienced by device 302. At block 408, augmentation module 330 generates augmented reality content 344.

At decisional block 410, a determination is made whether reality content 340 meets and/or anticipates capture event criteria 352. If so, the method proceeds to block 418, where capture module 332 initiates a capture of augmented reality content 344. For example, capture module 332 may interface with rendering engine 336 and/or frame buffer 338 to access/store augmented reality content 344 prior to presentation of such content to the user of device 302. If at decisional block 410 it is determined that reality content 340 does not meet and/or anticipate capture event criteria 352, the method proceeds to decisional block 414. At decisional block 414, a determination is made whether augmentation data 342/306 meets and/or anticipates capture event criteria 352. If so, the method proceeds to block 418, where capture module 332 initiates a capture of augmented reality content 344. Thus, in the illustrated embodiment, real-world content and content derived to augment the real-world content may be independently evaluated to determine whether such respective content meets (or appears that it will meet) criteria 352. If at decisional block 414 it is determined that augmentation data 342/306 does not meet and/or anticipate capture event criteria 352, the method proceeds to decisional block 416. At decisional block 416, a determination is made whether augmented reality content 344 meets and/or anticipates capture event criteria 352. If so, the method proceeds to block 418, where capture module 332 initiates a capture of augmented reality content 344. Thus, in the illustrated embodiment, the combination of real-world content and content derived to augment the real-world content may be evaluated to determine whether such respective content meets (or appears that it will meet) criteria 352. If at decisional block 416 it is determined that augmented reality content 344 does not meet and/or anticipate capture event criteria 352, the method proceeds to block 424.

At decisional block 420, a determination is made whether criteria 352 has been met. For example, in some embodiments, capture module 332 may be configured to initiate a capture of augmented reality content 344 prior to and/or in anticipation of reality content 340, augmentation data 342/306 and/or augmented reality content 344 meeting criteria 352. If criteria 352 was met, the method proceeds to block 424. If criteria 352 was not met, the method proceeds to block 422, where capture module 332 may cause the recently captured/stored augmented reality content 344 that did not meet criteria 352 to be purged/discarded. At block 424, augmentation module 330 and/or capture module 332 continues evaluating reality content 340, augmentation data 342/306 and/or augmented reality content 344. At block 426, the augmented reality content 344 is displayed/presented to the user of device 302.

Thus, embodiments of the present disclosure enable the dynamic and automatic creation/capture of augmented reality content (e.g., real-world content overlaid/supplemented with augmentation information). Embodiments of the present disclosure may evaluate the real-world events taking place as well as augmentation information that will supplement the real-word perception against certain predefined criteria to determine whether to initiate the capture/storage of augmented reality content. The captured augmented reality content may be in the form of video content, screenshots/images, audio, or otherwise. Further, embodiments of the present disclosure may spawn multiple threads to concurrently capture such augmented reality content as such content is being rendered on the device.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A system, comprising:
a device wearable by a user, the device having:
  a processor;
  an interface configured to receive and store, from the user, capture event criteria;
  an augmentation module executable by the processor to:
    receive and analyze reality image data corresponding to reality content perceived by the user within a field of view of the user;
    identify augmentation data based on the analysis of the reality image data; and display, within the field of view of the user in combination with the reality content being perceived by the user, the augmentation data to the user via the device; and a capture module executable by the processor to:
determine whether the reality data meets the capture event criteria; and
responsive to the reality data meeting the capture event criteria:
combine the augmentation data with the reality image data to generate augmented reality content; and
capture and store the augmented reality content prior to the display of the augmentation data to the user via the device within the field of view of the user in combination with the reality content being perceived by the user.

2. The system of claim 1, wherein the captured augmented reality content includes a video segment of the augmented reality content.

3. The system of claim 1, wherein the captured augmented reality content includes at least one image snapshot of the augmented reality content.

4. The system of claim 1, wherein the capture module is configured to:
anticipate that the reality data will meet the capture event criteria;
responsive to anticipating that the reality data will meet the capture event criteria, initiate the capturing and storing of the augmented reality content; and
responsive to the reality data not meeting the capture event criteria, discard the captured and stored augmented reality content.

5. The system of claim 1, wherein the capture module is configured to interface with a frame buffer of the device to access and store the augmented reality content prior to the display of the augmentation data via the device.

6. The system of claim 1, wherein the device further includes a wireless interface for receiving the capture event criteria.

7. A computer program product for dynamic augmented reality media creation, the computer program product comprising:
a computer readable storage medium having computer readable program code embodied therewith, the computer readable program code comprising computer readable program code configured to:
receive, from a user via an interface of a device wearable by the user, capture event criteria;
receive and analyze reality image data corresponding to reality content perceived by the user within a field of view of the user;
identify augmentation data based on the analysis of the reality image data;
display, within the field of view of the user in combination with the reality content being perceived by the user, the augmentation data to the user via the device;
determine whether the reality data meets the capture event criteria; and
responsive to the reality data meeting the capture event criteria:
combine the augmentation data with the reality image data to generate augmented reality content; and
capture and store the augmented reality content prior to the display of the augmentation data to the user via the device within the field of view of the user in combination with the reality content being perceived by the user.

8. The computer program product of claim 7, wherein the computer readable program code is configured to capture and store a video segment of the augmented reality content.

9. The computer program product of claim 7, wherein the computer readable program code is configured to capture and store at least one image snapshot of the augmented reality content.

10. The computer program product of claim 7, wherein the computer readable program code is configured to:
anticipate that the reality data will meet the capture event criteria;
responsive to anticipating that the reality data will meet the capture event criteria, initiate the capturing and storing of the augmented reality content; and
responsive to the reality data not meeting the capture event criteria, discard the captured and stored augmented reality content.

11. The computer program product of claim 7, wherein the computer readable program code is configured to interface with a frame buffer of the device to access and store the augmented reality content prior to the display of the augmentation data via the device.

12. The computer program product of claim 7, wherein the computer readable program code is configured to wirelessly receive the capture event criteria.

13. A system, comprising:
a device wearable by a user, the device having:
an imaging device configured to capture reality image data corresponding to reality content as perceived by the user via the device within a field of view of the user;
an augmentation module executable by a processor to:
analyze the reality image data;
identify augmentation data based on the analysis of the reality image data; and
display, within the field of view of the user in combination with the reality content being perceived by the user, the augmentation data to the user via the device; and
a capture module executable by the processor to:
determine whether the augmentation data meets capture event criteria; and
responsive to the augmentation data meeting the capture event criteria:
combine the augmentation data with the reality image data to generate augmented reality content; and
capture and store the augmented reality content prior to the display of the augmentation data to the user via the device within the field of view of the user in combination with the reality content being perceived by the user.

14. The system of claim 13, wherein the captured augmented reality content includes a video segment of the augmented reality content.

15. The system of claim 13, wherein the capture module is configured to:
anticipate that the augmentation data will meet the capture event criteria;
responsive to anticipating that the augmentation data will meet the capture event criteria, initiate the capturing of the augmented reality content; and responsive to the augmentation data not meeting the capture event criteria, discard the captured augmented reality content.

16. The system of claim 13, wherein the device further includes a wireless interface for receiving from the user the capture event criteria.

17. The system of claim 13, wherein the capture module is configured to cause a concurrent capture of video and snapshot images of the augmented reality content.

18. The system of claim 13, wherein the captured augmented reality content includes at least one image snapshot of the augmented reality content.

19. The system of claim 13, wherein the image capture module is configured to interface with a frame buffer of the device to access and store the augmented reality content prior to the display of the augmentation data via the device.

20. The system of claim 13, wherein the augmentation module is configured to audibly present the augmentation data to the user.

* * * * *